US008160393B2

(12) United States Patent
Honsinger et al.

(10) Patent No.: US 8,160,393 B2
(45) Date of Patent: Apr. 17, 2012

(54) METHOD FOR IMAGE SKEW DETECTION (75) Inventors: Chris W. Honsinger, Ontario, NY (US); Paul W. Jones, Churchville, NY (US)

(73) Assignee: Certifi Media Inc., Union Hill, NY (US)

( * ) Notice: Subject to any disclaimer, the term of this patent is extended or adjusted under 35 U.S.C. 154(b) by 402 days.

(21) Appl. No.: 12/559,755

(22) Filed: Sep. 15, 2009

(65) Prior Publication Data

US 2010/0067826 A1 Mar. 18, 2010

Related U.S. Application Data (60) Provisional application No. 61/097,888, filed on Sep. 18, 2008.

(51) Int. Cl.
G06K 9/36 (2006.01)
(52) U.S. Cl. ........................ 382/289; 382/280
(58) Field of Classification Search .................. 382/280, 382/289
See application file for complete search history.

(56) References Cited

U.S. PATENT DOCUMENTS

| 4,723,297 | A | * | 2/1988 | Postl | 382/289 |
| 5,001,766 | A | * | 3/1991 | Baird | 382/290 |
| 5,187,753 | A | * | 2/1993 | Bloomberg et al. | 382/289 |
| 5,245,676 | A | * | 9/1993 | Spitz | 382/235 |
| 5,355,420 | A | * | 10/1994 | Bloomberg et al. | 382/155 |
| 5,452,374 | A | * | 9/1995 | Cullen et al. | 382/293 |
| 5,563,403 | A | * | 10/1996 | Bessho et al. | 250/208.1 |
| 6,373,997 | B1 | * | 4/2002 | Wayner et al. | 382/289 |
| 6,985,640 | B2 | * | 1/2006 | Schweid | 382/289 |
| 7,142,727 | B2 | * | 11/2006 | Notovitz et al. | 382/289 |
| 7,336,813 | B2 | * | 2/2008 | Prakash et al. | 382/139 |
| 2003/0026482 | A1 | * | 2/2003 | Dance | 382/199 |
| 2010/0067826 | A1 | * | 3/2010 | Honsinger et al. | 382/280 |

OTHER PUBLICATIONS

A. Amin and S. Fischer, "A Document Skew Detection Method Using the Hough Transform," Pattern Anal. Appl. 3, 243-253 (2000).*
G. Peake and T. Tan, "A General Algorithm for Document Skew Angle Estimation," Proc. Int"l Conf. Image Processing, vol. 2, pp. 230-233, 1997.*
S. Lowther et al., "An Accurate Method for Skew Determination in Document Images", DICTA2002: Digital Image Computing Techniques and Applications, pp. 1-5, Jan. 21-22, 2002.*

(Continued)

*Primary Examiner* — Jason M Repko
*Assistant Examiner* — Gandhi Thirugnanam
(74) *Attorney, Agent, or Firm* — Louis S. Horvath (57) ABSTRACT

A method for calculating a skew angle of an original image, executed at least in part on a computer system stores image data for the original image in an electronic memory, then forms an energy-normalized image according to the relative contrast amplitude of image features over each of a plurality of local image regions within the stored image data. A partitioned image is formed by partitioning the energy-normalized image into a number of sub-regions. A summed region is formed as a combination of image pixel data from the sub-regions. A Fourier magnitude spectrum is obtained by performing a Fourier transform on the summed region. The skew angle is calculated according to the peak value of a radial line integration function that is formed by integrating the Fourier magnitude spectrum along each of a plurality of lines of constant radial angles. An output signal indicates the calculated skew angle.

12 Claims, 6 Drawing Sheets

OTHER PUBLICATIONS

Postl, W. "Detection of linear oblique structures and skew scan in digitized documents", Proc. of Inter. Conf. on Pattern Recognition, pp. 687-689, 1986.*

G. Peake and T. Tan, "A General Algorithm for Document Skew Angle Estimation," Proc. International Conference on Image Processing (ICIP '97), vol. 2, p. 230 (1997).

* cited by examiner

Fig. 1

Fourier magnitude spectrum

METHOD FOR IMAGE SKEW DETECTION

RELATED APPLICATIONS

Reference is made to, and priority is claimed from, U.S. Application No. 61/097,888 filed as a Provisional patent application on Sep. 18, 2008, entitled "METHOD FOR IMAGE SKEW DETECTION", in the names of Paul W. Jones and Chris W. Honsinger and commonly assigned.

FIELD OF THE INVENTION

The invention relates generally to the field of image processing, and in particular to automatically correcting for a rotational skew that is imparted to a document during a digital scanning process. The invention utilizes algorithms known in signal processing and spectrum analysis. The invention should be useful to those engaged in document digitization, photography, and in other areas where the image rotation needs to be determined and either reported or corrected to a desired orientation.

BACKGROUND OF THE INVENTION

Many applications of scanned document data depend on the document content being properly oriented to the horizontal and vertical directions represented by the rows and columns of the digital image. For example, OCR (Optical Character Recognition) provides a computer-useable interpretation of scanned letters and words. It is well known that the performance of OCR is dependent on the image quality and the skew angle of the scanned document. Also, many governments and organizations around the globe are digitizing historical documents and providing them as digital documents on the Internet. A typical requirement of the digitization process, when combined with subsequent image processing, is that the documents appear without skew. Skew must be corrected prior to performing character recognition of the document image.

Skew correction requires the determination of a skew angle and the modification of a document image representation based on the skew angle. With regard to skew angle determination, a first known method is based on the Hough Transform. In the Hough Transform, the digital image data that represents the document is transformed into a polar coordinate space. By identifying the maximum peak in the polar coordinate, the skew angle is directly obtained from its polar angle. The Hough Transform method is disadvantaged as it requires extensive computation time. In addition, this method is often not sensitive enough to accurately determine the skew angle.

A second type of method is described in U.S. Pat. No. 5,001,766 entitled "Apparatus and Method for Skew Control of Document Images" to Baird. In this method, a two dimensional Fourier transform of the original document image is computed, and the result is again projected to polar coordinates as in the Hough transform. The maximum of the projected values gives the angle of skew. This method has been found to provide high accuracy, up to 2 minutes of arc, but again requires considerable processing time and resources.

More recent research involving skew detection has focused on the use of connected component analysis as in U.S. Pat. No. 7,336,813 entitled "System and Method of Determining Image Skew Using Connected Components" to Prakash et al. This approach depends on text and graphic image separation, which is not characteristic of all images, and can be computationally intensive. Still other methods are constrained for use only with binary image input (1 bit/pixel) as in U.S. Pat. No. 6,985,640 entitled "Parallel Non-Iterative Method of Determining and Correcting Image Skew" to Schweid and in U.S. Pat. No. 7,142,727 entitled "Non-Iterative Method of Calculating Image Skew" to Notovitz et al.

Since the work disclosed in the Baird '766 patent, there appears to be little interest in utilizing the Fourier type transform for addressing the problem of skew angle detection. One exception is the work of G. Peake and T. Tan in "A General Algorithm for Document Skew Angle Estimation," *Proc. International Conference on Image Processing (ICIP '97)*, Volume 2, p. 230 (1997). In the Peake and Tan approach, a method provided for calculating the skew angle of scanned document images. The method is designed to be insensitive to document layout, line spacing, font, graphics/images and, most importantly, to the language or script of the document. This is achieved by examining the Fourier spectra of blocks of the document image for peak pairs corresponding to the angle of skew. From a histogram compiled over all blocks in the document image the correct skew angle can be determined to within approximately 0.5 degrees, regardless of document script, even when the image contains considerable graphical information.

One problem with the algorithm described in the Peake and Tan article is that for each block of data examined, a Fourier Transform must be computed and peaks must be identified and managed thereafter. In practice, this calculation sequence proves to be computationally prohibitive. For example, for a 4096×4096 pixel input image with a 256×256 pixel block size, 256 individual Fourier transforms must be calculated.

Thus, there is a need to address the problem of skew angle detection with a method that provides improved accuracy over conventional techniques and that is computationally efficient.

SUMMARY OF THE INVENTION

It is an object of the present invention to advance the art of image processing for scanned digital images. With this object in mind, the present invention provides a method for calculating a skew angle of an original image, the method executed at least in part on a computer system and comprising:
  storing image data for the original image in an electronic memory;
  forming an energy-normalized image according to the relative contrast amplitude of image features over each of a plurality of local image regions within the stored image data;
  forming a partitioned image by partitioning the energy-normalized image into a plurality of sub-regions;
  forming a summed region as a combination of image pixel data from the plurality of sub-regions;
  obtaining a Fourier magnitude spectrum by performing a Fourier transform on the summed region;
  calculating the skew angle according to the peak value of a radial line integration function that is formed by integrating the Fourier magnitude spectrum along each of a plurality of lines of constant radial angles; and providing an output signal that is indicative of the calculated skew angle.

ADVANTAGEOUS EFFECT OF THE INVENTION

It is an advantage of the method of the present invention that it automatically detects the angle at which an image is skewed with reduced impact on logic processing and image storage resources.

It is another advantage of the present invention that it is not dependent on identifying page boundaries or on the relative amplitudes of linear features within an image as is typical of conventional solutions.

These and other aspects, objects, features, and advantages of the present invention will be more clearly understood and appreciated from a review of the following detailed description of the preferred embodiments and appended claims, and by reference to the accompanying drawings.

DETAILED DESCRIPTION OF THE INVENTION

In the disclosure that follows, elements not specifically shown or described may take various forms well known to those skilled in the art. Terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Figure 1:
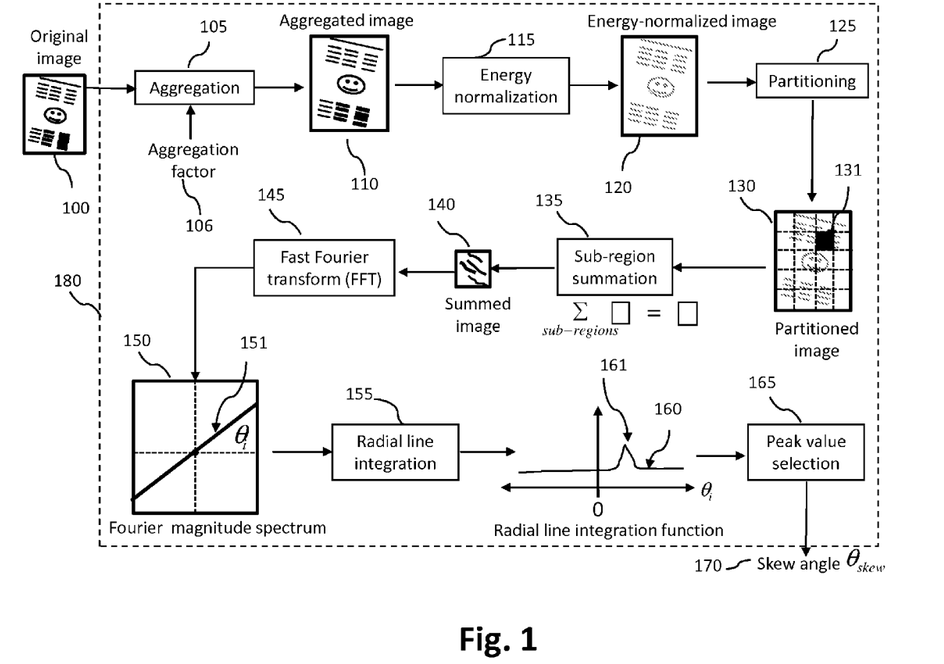
FIG. 1 illustrates a method of the present invention for estimating the skew angle of an original image.

Referring to FIG. 1, a digitized image 100 is received by a computer from a digital image scanning device. The scanning device can be, for example, a flatbed scanner, book scanner, sheet fed scanner, digital camera, or any other digital imaging device. The scanning device provides the image in the form of image pixels or, equivalently, as "image pixel data", "pixel data", "pixel data values", or "pixel values", as these terms are conventionally understood by those skilled in the image processing arts.

In one embodiment of the present invention, digitized image 100 is read into computer memory and is then aggregated in an optional aggregation step 105 to produce an aggregated image 110. Aggregation step 105 averages the pixel values over N×N image regions to form a reduced-resolution version of the original image. For example, if a digitized image 100 has input dimensions of 8K pixels×8K lines, the output of the aggregation step 105 with an aggregation factor 106 that has a value N=8 is an aggregated image with dimension of 1K pixels×1K lines. Aggregation in this example can be conceptualized as averaging every 8×8 region of the image and using the average values as the pixel values in the aggregated image.

Various alternate image size reduction methods may be used to achieve a similar result as aggregation step 105. However, aggregation is desirable because it is computationally efficient, and our experience has shown that aliasing effects produced by aggregation, while present in the aggregated image, are minimal for the practice of the invention. Although aggregation step 105 is not necessary to practice the present invention, it serves to significantly improve the computational speed of the method described herein for a more efficient workflow. Empirically, it has been found that an aggregation factor equal to (Number of rows or columns)/1024 works well for many scanned document applications. However, any suitable aggregation factor can be chosen, as long as the salient edge features of an image are retained in aggregated image 110, to be processed in the remaining steps of the present invention.

Once the image has been reduced in size by aggregation step 105, the aggregated image 110 is subject to an energy normalization step 115 to produce an energy-normalized image 120. The effect of energy normalization 115 is to normalize the energy over local M×M regions within an image, where M is a small value such as 3 or 5, for example. As used in describing the present invention, the term "energy normalization" means producing an image with contrast amplitudes that are relatively constant when measured over any local region of the image, while still maintaining the edge characteristics of the image.

In the present invention, the skew angle of an image is calculated primarily by analyzing the orientation of linear features that occur in the image content. For example, scanned images of letters, newspapers, and diaries will include content having many linear features related to the structures of characters, words, and sentences. Likewise, many photographs contain linear features that arise from vertical and horizontal structures that are often present in nature, such as trees and the horizon, for example, and in man-made artifacts such as buildings and furniture, for example. The features comprised within an image often have vastly different contrasts, even when the features should be relatively consistent throughout the image, such as would be expected in most documents. The effect of energy normalization is to produce an image with such linear features having a more nearly constant contrast throughout the image. The benefit of constant or normalized contrast for features, when using them to determine a skew angle, is that the process largely becomes independent of the color or the original contrast of the features in the aggregated image. It also means that other non-linear features will be presented in a way such that they will not over- or under-influence the skew estimation process.

In one embodiment of the present invention, energy normalization is performed using moment normalization, which normalizes the mean and variance (or equivalently, standard deviation) over the local image regions. The desired standard deviation of the moment-normalized image is denoted by $\sigma_d$. Denoting the pixel value at location (x, y) of an image by f(x, y) and the computed local mean and local standard deviation by $\mu(x, y)$ and $\sigma(x, y)$, respectively, the moment normalized pixel value f'(x, y) is computed according to the relationship:

$$f'(x, y) = \frac{\sigma_d}{\sigma(x, y)}[f(x, y) - \mu(x, y)]. \tag{1}$$

In another embodiment of the present invention, in flat areas where $\sigma(x, y) \rightarrow 0$, a modified pixel value f'(x, y) is set to a value taken from a random number generator with a standard deviation equal to $\sigma_d$. Introducing this random component is not necessary for the practice of the invention, but it can be beneficial in improving the final results.

Moment normalization is a spatially adaptive, nonlinear process, and it cannot be implemented as simple high-pass filtering. An alternate approach to moment normalization that does not produce a singularity when σ(x, y)→0 employs the following equation:

$$f'(x, y) = \frac{\sigma_d}{\sigma(x, y) + \lambda}[f(x, y) - \mu(x, y)] \qquad (2)$$

where λ is chosen to be positive and is small relative to $\sigma_d$.

If moment normalization is implemented with pixel values that have a normalized floating point representation, the value of $\sigma_d$ can be set to 1.0 and the mean of each local region of an image will be zero. If only unsigned integers are available, then a constant value must be added to right side of Eq. 1 or Eq. 2 to support the negative values resulting from the equation. This additive constant needs to be large enough to guarantee that no negative numbers result from the application of the equation.

It is appreciated that energy normalization can be effected using other approaches. For example, simply normalizing the minimum-to-maximum pixel contrast over each local region could be used. As another example, consider that the standard deviation term σ(x, y) in moment normalization can be thought of as the square root of the average of the squares of each mean-removed area. In a similar manner, it is possible to also use the cubed root of the average of the cubes of each mean-removed area.

After energy normalization 115 is applied, energy-normalized image 120 is processed in a partitioning step 125 to produce a partitioned image 130 with image sub regions 131 of size P×P, where P is chosen to be compatible with a 2-D fast Fourier transform (for example, P is typically a power of 2, that is, $2^n$). For example, in one embodiment, the partition size is $2^8 \times 2^8$, that is, 256×256. In practice, however, any size between 64×64 and 512×512 has been found to work well for typical images.

Once the partition size is defined, sub-regions 131 are combined together in a summation step 135 to form a summed image 140. In one embodiment, sub-regions 131 are effectively "stacked" atop each other and the corresponding pixels from each sub-region 131 summed together. This sum is best represented in a high dynamic range 16- or 32-bit integer or in floating point representation to preserve all of the data. Summed image 140 appears very noisy, and linear features that are present in digitized image 100 are randomly placed with respect to their origins in the summed image.

It is important to note that sub-regions 131 may have varying degrees of noise or features that are unwanted. In this case, the pixel data values for one or more sub-regions can be pre-multiplied by a scalar whose value is proportional to the relative importance or desirability of the sub-region. Experimentation on multiple image sets suggests that combining images in this manner may not provide a significantly observable improvement in general; but there are specific applications where combining images in this manner provides a superior result. One example is when a camera is used to digitize a page on a background area and the background area is included in the image used in the skew detection algorithm. If the background is detectable from the page, scalars can be calculated to emphasize sub-regions that contain more page area and to deemphasize the sub-regions that contain more background area.

Summed image 140 is then processed with a fast Fourier transform (FFT) 145 to produce a 2-D Fourier magnitude spectrum 150. Taking the Fourier magnitude of the summed image effectively gathers the linear features with random placement and constructively adds them along common angular orientations. The result is one or more lines in Fourier magnitude spectrum 150; and FIG. 1 illustrates an example of a single line 151 in Fourier magnitude 150 that is oriented at an angle $\theta_i$ with respect to the horizontal axis. All lines in Fourier magnitude spectrum 150 emanate from the Fourier magnitude origin (or equivalently, the "DC" value). The result is that linear features with random placement in summed image 140 are now represented in the Fourier magnitude spectrum by lines that all start at DC but represent the slope as was present in the summed image. Consequently, linear features of digitized image 100 with common slope are, in effect, added together in the Fourier magnitude spectrum onto a common line of common origin, and the signal strength of the summed linear features significantly rises despite noise in the Fourier magnitude spectrum.

Radial line integration 155 is then performed on Fourier magnitude spectrum 150 by summing the magnitude values along a given line orientation, and repeating this summation over a range of angles. Radial line integration 155 produces a radial line integration function 160 that represents the summed Fourier magnitude value as a function of the angle $\theta_i$.

Radial line integration function 160 is analyzed by a peak value selection step 165 to determine a peak value 161 of the radial line integration function results. The angle that corresponds to the peak value is chosen as an estimated skew angle 170 for original image 100. Estimated skew angle 170 is displayed on a computer monitor in one embodiment; more generally, estimated skew angle 170 is provided as an output signal, such as an encoded digital signal that is indicative of the calculated skew angle $\theta_{skew}$.

Figure 2:
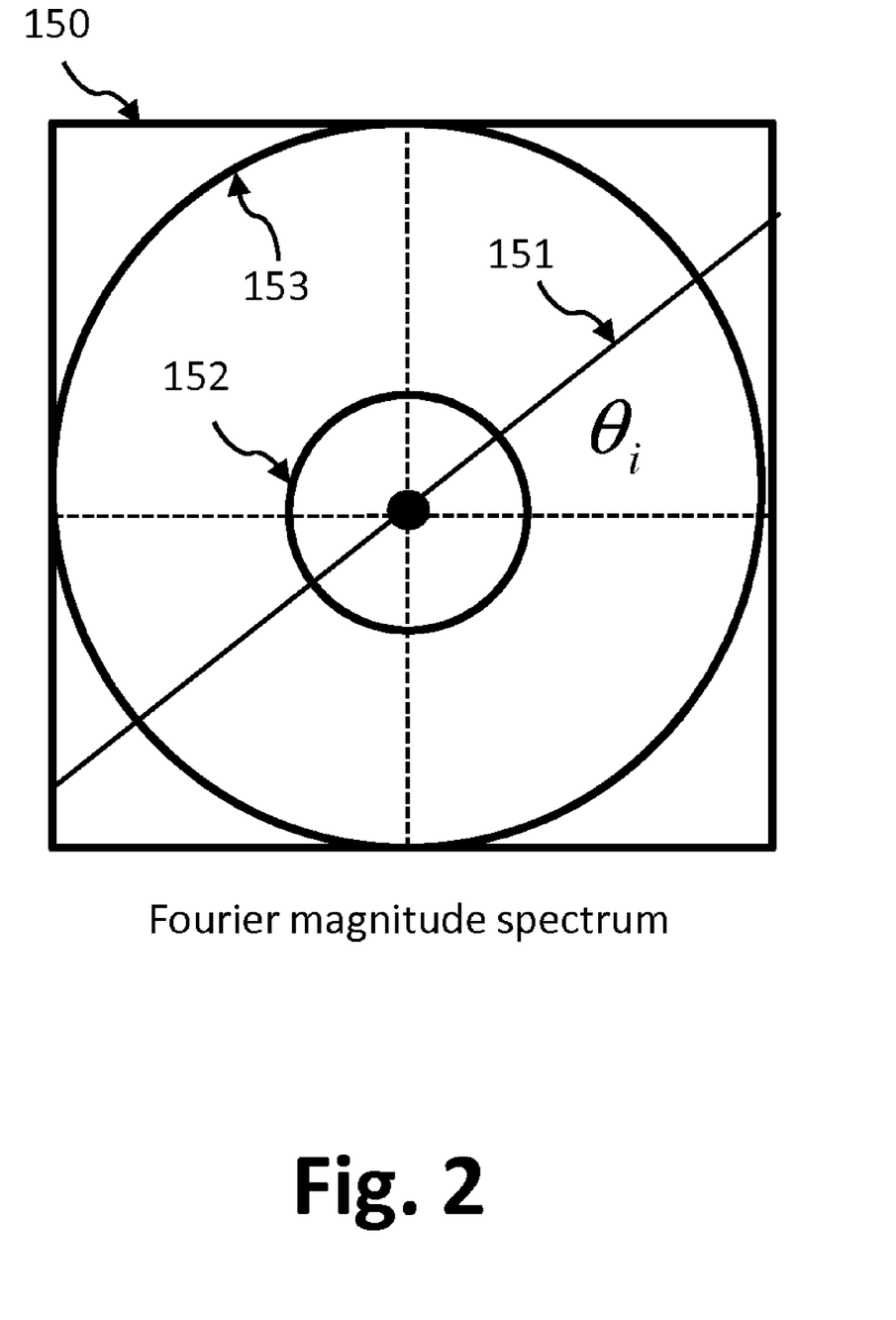
FIG. 2 illustrates an example of an annular summation region in a Fourier magnitude spectrum.

Referring to FIG. 2, the calculation of radial line integration function 160 is described in more detail. FIG. 2 illustrates Fourier magnitude spectrum 150 with a radial line 151 oriented at an angle $\theta_i$. Empirically, the inventors have determined that the radial line integration is best performed over an annulus centered about the DC value of the Fourier magnitude image, or equivalently, between a minimum radius 152 and a maximum radius 153, denoted as $r_{min}$ and $r_{max}$, respectively. For example, $r_{min}$ can be chosen as (0.5*Nyquist frequency) and $r_{max}$ can be chosen as (1.0*Nyquist frequency) where Nyquist frequency is the maximum spatial frequency of the Fourier magnitude spectrum. The equation for the radial line integration at a given angle $\theta_i$ is thus:

$$s(\theta_i) = \int_{r_{min}}^{r_{max}} \text{FFTMAG}(r, \theta_i). \qquad (3)$$

It is worthwhile to note that the Fourier magnitude image is inherently redundant, which means that about half of the Fourier magnitude spectrum 150 as depicted in FIG. 2 may be derived using symmetry principles from the non-redundant half. This leaves an angular region of interest of −90 to +90 degrees to be evaluated for the peak magnitude. In one embodiment of the present invention, no distinction is made as to whether original image 100 is upside down or is rotated by 90 degrees. This leaves an angular region of interest of only −45 to +45 degrees to be evaluated, thus improving the computational efficiency. In this embodiment, the radial integration can be performed by adding together $s(\theta_i)$ with $s(\theta_i + 90°)$ to obtain a single sum at angle $\theta_i$.

Figure 3:
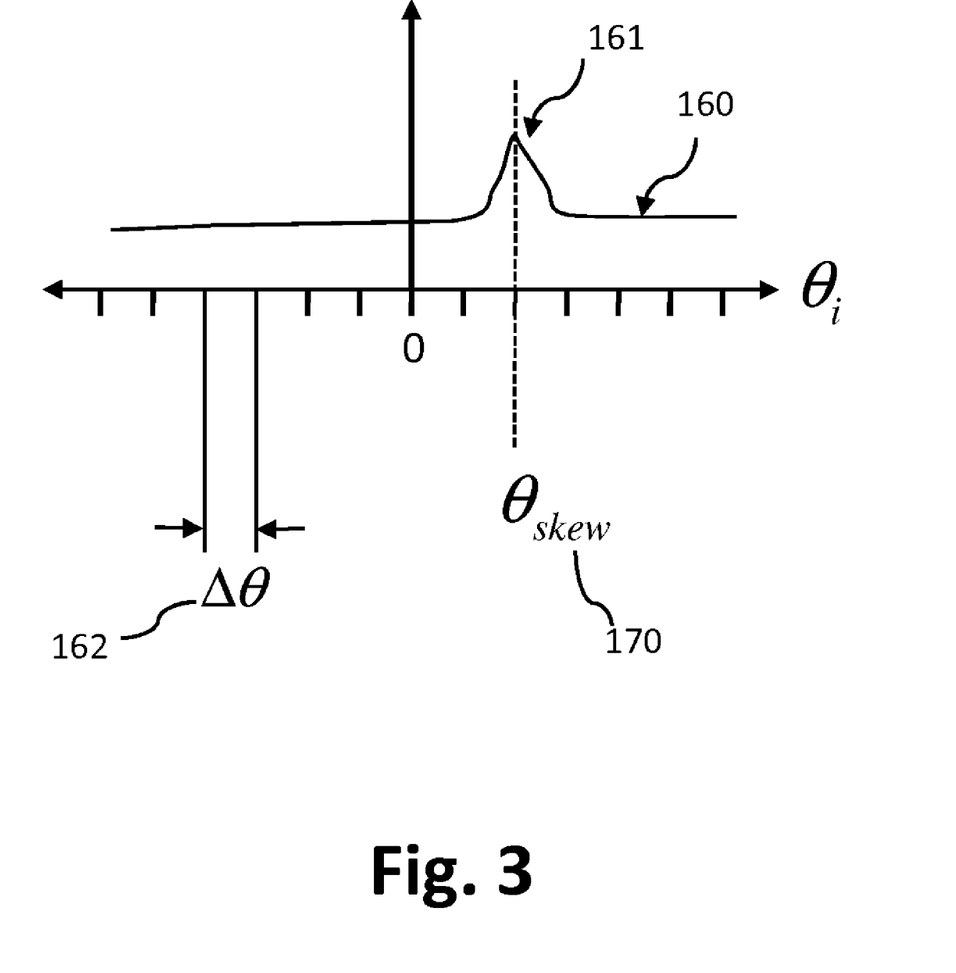
FIG. 3 illustrates an example of a radial line integration function that is evaluated at regular angular increments.

As mentioned previously, the peak value of radial line integration function 160 is used to determine skew angle 170. FIG. 3 illustrates the use of a user-defined angular increment 162, denoted as Δθ, to control the precision at which the radial line integration function is sampled when determining the peak value. As an example, Δθ can be set to 0.1 degrees. For each angle $\theta_i$ occurring between −45 to +45 degrees in increments of $\Delta\theta$, the radial line integration value is calculated using the sum of $s(\theta_i)$ and $s(\theta_i+90°)$.

To further reduce the number of computations, it may be advantageous to allow a user to restrict the angular search to less than −45 to +45 degrees. Users can define an angular search range that might typically occur in images produced by their scanning applications, such as −5 to +5 degrees.

Figure 4:
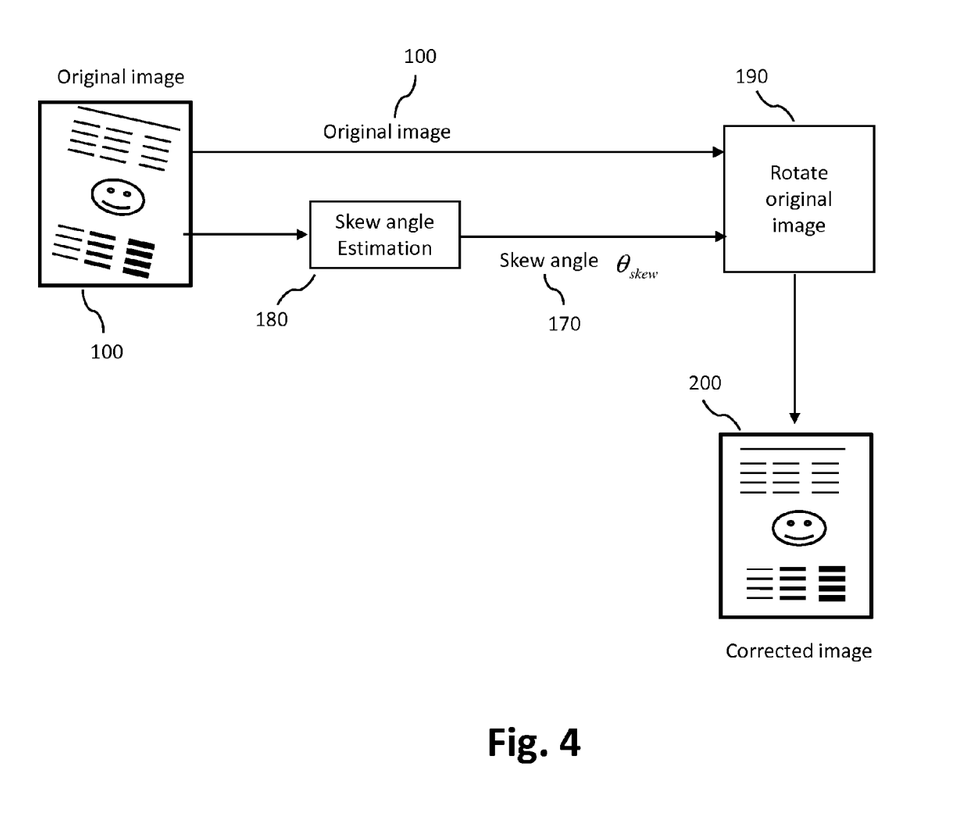
FIG. 4 illustrates an example of a method for using the present invention to correct the skew of an original image.

Referring to FIG. 4, skew angle estimation 180, as described previously and illustrated in FIG. 1, is shown being used to automatically correct the skew of an original image 100. Skew angle estimation 180 produces a skew angle 170. An image rotation step 190 accepts skew angle 170 and original image 100 and produces a corrected image 200. Image rotation step 190 can be executed using a variety of image rotation algorithms that are well-known to those skilled in the art. It is noted that the original image is rotated by the negative of the skew angle in order to correct for the unwanted skew.

It should be pointed out that the calculation and processing that is described with respect to FIG. 1 provides an estimate of the skew angle, accurate to within some level of confidence. In any automated image processing algorithm, such as the automated skew correction that was just described, there can be some uncertainty and will likely be cases where the algorithm does not achieve the desired level of performance. For example, the estimated skew angle may be in error by several degrees of rotation for images in which there are a limited number of linear features in the image content. Where this uncertainty can be a factor, it is desirable to provide a signal to the user indicative that the estimated skew angle may be an unreliable estimate so that a user may take appropriate action, such as reviewing displayed results and, if needed, manually performing the rotation to achieve a desired alignment. Providing such feedback to the user is particularly beneficial when a large number of images are being scanned and processed, for example. In such high-volume processing, the user often cannot visually inspect each processed image because of the time and cost. By identifying only those processed images for which there is lower confidence in skew detection performance, the method of the present invention can help the user to more consistently achieve desired workflow efficiency and results with a more efficient expenditure of time and resources.

Figure 5:
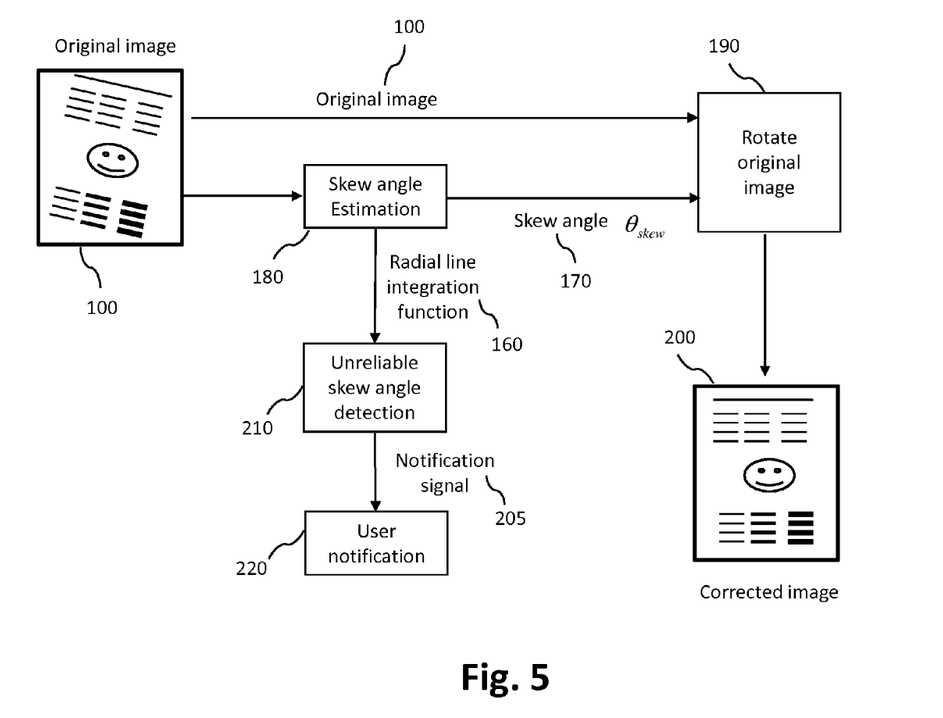
FIG. 5 illustrates an example of a method for using the present invention to correct the skew of an original image with a signal sent to a user if the skew angle estimate is determined to be unreliable.

In general, radial line integration function 160 (FIG. 3) is a fairly smooth function with one or more pronounced peaks. However, there can be cases for which results are more ambiguous, resulting in a lower confidence level for skew level calculation accuracy. Referring to FIG. 5, skew angle estimation 180 can provide radial line integration function 160 to an unreliable skew angle detection 210 that determines if the skew angle estimate is reliable or not and indicates a relative level of confidence via a notification signal 205. In one embodiment of the present invention, peak value 161 of the radial line integration function is compared against a pre-determined threshold value. If the peak value is less than the threshold, skew angle $\theta_{skew}$ may be an unreliable estimate and the user is notified by a lower confidence-level notification signal 205 provided in a displayed message or by other means in a user notification 220. Similarly, a radial line integration function with multiple elevated values within some pre-determined tolerance around the peak value may indicate a lower level of confidence in skew angle estimation. In such a case, the user is again notified by a confidence-level notification signal 205 provided in a displayed message or by other means in a user notification 220 that the estimated skew angle may be an unreliable estimate. As a visual check, the user may then view a displayed version of corrected image 200 to see if it has the proper skew correction. If it does have the proper skew correction, no additional action is required. If the user decides that the corrected image has not been deskewed properly, the user can manually process original image 100 with a desired amount of rotation correction.

Figure 6:
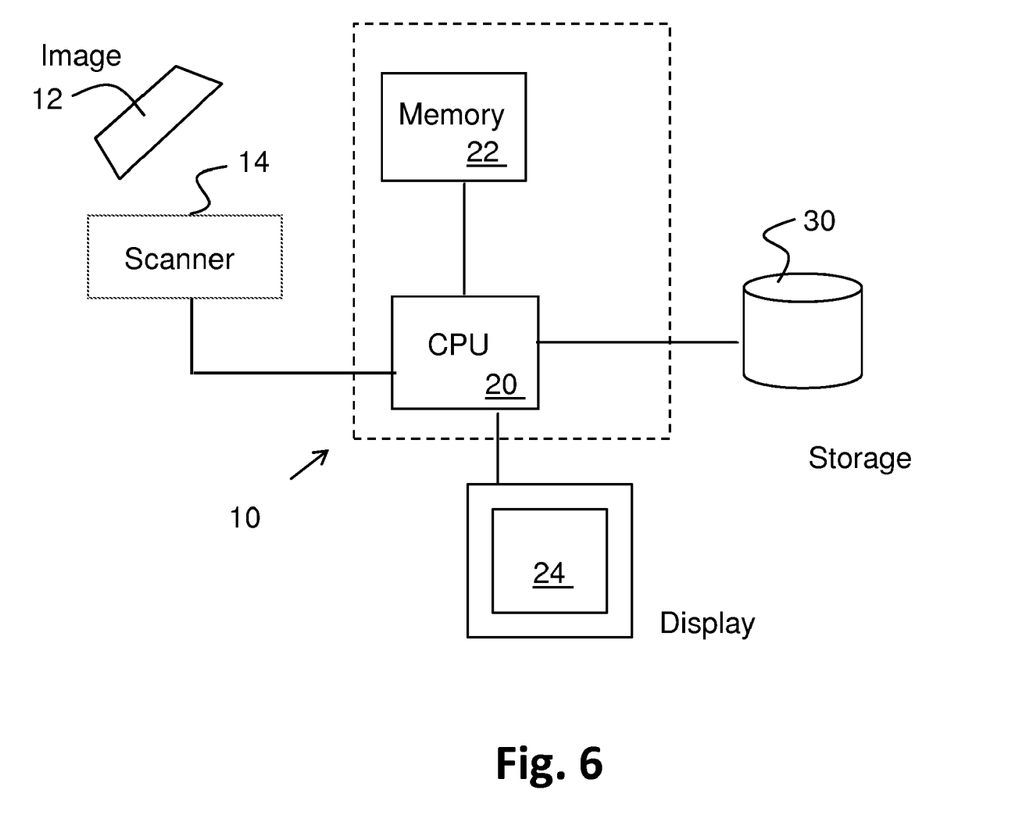
FIG. 6 shows a block diagram of a computer system that implements the method of the present invention in one embodiment.

The method of the present invention executes on a computer workstation, host processor, microprocessor, or other type of computer system. By way of example, FIG. 6 shows a block diagram of a computer system 10 that implements this method in one embodiment. An image 12 from a document or other source is scanned at a scanner 14 and provides digital image data that is obtained by a control logic processor or other type of CPU 20 and stored in an electronic memory 22 that is associated with computer system 10. CPU 20 executes stored instructions that carry out the skew angle estimation processing described herein and display results by sending an appropriate output signal to an associated display 24, such as providing an appropriate digital value, for example. Display 24 may show the original scanned image from image data, as well as showing the calculated skew angle. Display 24 may also show an image with skew angle corrected by an algorithm executed by CPU 20 using the output signal from skew angle calculation. A storage device 30, such as a networked storage device, can then be used to store the original and corrected image following execution of skew angle calculation and processing.

Embodiments of the present invention may have the form of computer-implemented processes and apparatus for practicing those processes. Embodiments of the invention may also be embodied in the form of computer program code containing instructions embodied in tangible media, such as magnetic storage media such as a hard drive or removable magnetic media, optical storage media such as CD-ROMs, or any other computer-readable storage medium, wherein, when the computer program code for the embodiment is loaded into and executed by a computer or other host processor, the computer or processor becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a suitable logic processor or computer, the computer becomes an apparatus for practicing the invention. When implemented on a general-purpose microprocessor, the computer program code segments configure the microprocessor to create specific logic circuits for program logic execution. One or more encoded signals that are provided as output are used to provide a displayed value or to provide a value to a corrective algorithm for image de-skew.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

PARTS LIST 10 computer system
12 image 14 scanner
20 CPU
22 memory
24 display
30 storage device
100 digitized image
105 aggregation step
110 aggregated image
115 energy normalization
120 energy-normalized image
125 partitioning step
130 partitioned image
131 sub-regions
135 summation step
140 summed image
145 fast Fourier transform
150 2-D Fourier magnitude spectrum
151 line
152 minimum radius
153 maximum radius
155 radial line integration
160 radial line integration function
161 peak value
162 angular increment
165 peak value selection step
170 estimated skew angle
180 skew angle estimation
190 image rotation step
200 corrected image
205 confidence-level notification signal
210 Unreliable skew angle detection
220 User notification

We claim:

1. A method for calculating a skew angle of an original image, the method executed at least in part on a computer system and comprising:
storing image data for the original image in an electronic memory;
forming an energy-normalized image according to the relative contrast amplitude of image features over each of a plurality of local image regions within the stored image data;
forming a partitioned image by partitioning the energy-normalized image into a plurality of sub-regions;
forming a summed region as a combination of image pixel data from the plurality of sub-regions;
obtaining a Fourier magnitude spectrum by performing a Fourier transform on the summed region;
calculating the skew angle according to a peak value of a radial line integration function that is formed by integrating the Fourier magnitude spectrum along each of a plurality of lines of constant radial angles; and
providing an output signal that is indicative of the calculated skew angle.

2. The method of claim 1 further comprising rotating the original image according to the calculated skew angle.

3. The method of claim 1 further comprising preprocessing the stored image data to reduce image resolution.

4. The method of claim 1 further comprising preprocessing the stored image data by averaging pixel values over one or more regions of the image.

5. The method of claim 1 wherein providing the output signal comprises providing an encoded digital value.

6. The method of claim 1 wherein forming the summed region comprises adding corresponding pixel data values from each of the plurality of sub-regions.

7. The method of claim 1 further comprising providing a confidence-level signal that is indicative of a confidence level related to the calculated skew angle.

8. The method of claim 1 wherein forming the energy-normalized image comprises normalizing the mean and variance over the local image regions.

9. The method of claim 1 wherein forming the energy-normalized image comprises normalizing the minimum-to-maximum pixel contrast over each of the plurality of image regions.

10. The method of claim 1 wherein forming the partitioned image comprises forming the plurality of sub-regions of pixels, the sub-regions of size P×P, wherein P is an integer.

11. The method of claim 10 further comprising multiplying pixel data values for one or more sub-regions by a scalar.

12. The method of claim 10 wherein P is a power of 2.

* * * * *